US009103646B2

(12) United States Patent
Bur et al.

(10) Patent No.: US 9,103,646 B2
(45) Date of Patent: Aug. 11, 2015

(54) ACTIVE FUEL MANAGEMENT SYSTEMS AND METHODS FOR VEHICLES WITH A MANUAL TRANSMISSION

(76) Inventors: Bradford W. Bur, Clarkston, MI (US); William L. Cousins, Ortonville, MI (US)

( * ) Notice: Subject to any disclaimer, the term of this patent is extended or adjusted under 35 U.S.C. 154(b) by 964 days.

(21) Appl. No.: 13/228,790

(22) Filed: Sep. 9, 2011

(65) Prior Publication Data

US 2012/0158270 A1   Jun. 21, 2012

(51) Int. Cl.
| | | |
|---|---|---|
| *F02D 41/12* | (2006.01) | |
| *F02D 41/30* | (2006.01) | |
| *G01B 7/00* | (2006.01) | |
| *F16H 59/04* | (2006.01) | |
| *F16H 59/70* | (2006.01) | |

(52) U.S. Cl.
CPC .............. *G01B 7/003* (2013.01); *F16H 59/044* (2013.01); *F16H 59/70* (2013.01); *F02D 41/123* (2013.01); *Y10T 74/2003* (2015.01); *Y10T 74/2014* (2015.01); *Y10T 74/20018* (2015.01)

(58) Field of Classification Search
CPC ..... F02D 41/0087; F02D 17/02; F02D 13/06; F02D 41/042; F02D 2041/001; F02D 29/02; F02D 2041/0012; F02D 41/0002; F02D 41/123; Y02T 10/18; Y02T 10/42; Y02T 10/48; Y02T 10/44; B60W 10/06; F02N 11/0822; F01L 13/0005; F01L 2013/001
USPC ......... 123/481, 198 DB, 198 F, 491, 492, 493
See application file for complete search history.

(56) References Cited

U.S. PATENT DOCUMENTS

| | | | |
|---|---|---|---|
| 4,371,051 | A | 2/1983 | Achterholt |
| 4,488,455 | A | 12/1984 | Shetler et al. |
| 4,622,637 | A | 11/1986 | Tomita et al. |
| 4,701,852 | A | 10/1987 | Ulveland |
| 4,723,215 | A | 2/1988 | Hibino et al. |
| 4,752,883 | A | 6/1988 | Asakura et al. |
| 5,020,361 | A | 6/1991 | Malecki et al. |
| 5,797,110 | A | 8/1998 | Braun et al. |
| 5,941,922 | A | 8/1999 | Price et al. |
| 6,364,810 | B1 | 4/2002 | Hughes |

(Continued)

FOREIGN PATENT DOCUMENTS

| | | |
|---|---|---|
| DE | 3823384 A1 | 1/1990 |
| DE | 19908036 A1 | 8/2000 |

(Continued)

OTHER PUBLICATIONS

U.S. Appl. No. 61/425,626, filed Dec. 21, 2010, Benson et al.

(Continued)

*Primary Examiner* — Hai Huynh
*Assistant Examiner* — Raza Najmuddin

(57) ABSTRACT

A system for a vehicle includes an active fuel management (AFM) module, an expected engine speed determination module, and a disabling module. The AFM module selectively cuts off fuel to at least one cylinder of an engine and maintains valves of the at least one cylinder in closed positions. The expected engine speed determination module determines an expected engine speed based on a position of a shift lever of a manual transmission measured using a position sensor module. The disabling module selectively disables the AFM module based on the expected engine speed.

16 Claims, 5 Drawing Sheets

(56) References Cited

U.S. PATENT DOCUMENTS

| | | | |
|---|---|---|---|
| 6,367,344 B1 | 4/2002 | Vogt et al. | |
| 6,382,045 B1 | 5/2002 | Wheeler | |
| 6,550,351 B1 | 4/2003 | O'Reilly et al. | |
| 6,591,705 B1 * | 7/2003 | Reik et al. | 74/343 |
| 6,658,960 B2 | 12/2003 | Babin et al. | |
| 7,051,609 B2 | 5/2006 | Zimmermann et al. | |
| 7,328,686 B2 | 2/2008 | Cullen | |
| 7,449,878 B2 | 11/2008 | Lee | |
| 7,668,630 B2 | 2/2010 | Weber et al. | |
| 7,810,473 B2 * | 10/2010 | Ezaki et al. | 123/481 |
| 8,229,632 B2 * | 7/2012 | Ellis et al. | 701/54 |
| 8,521,376 B2 | 8/2013 | Katrak et al. | |
| 8,682,544 B2 | 3/2014 | Hashimoto | |
| 8,739,647 B2 | 6/2014 | Benson et al. | |
| 8,746,104 B2 | 6/2014 | Benson et al. | |
| 2003/0056614 A1 | 3/2003 | Babin et al. | |
| 2003/0159534 A1 | 8/2003 | Babin et al. | |
| 2004/0024513 A1 | 2/2004 | Aizawa et al. | |
| 2004/0104719 A1 | 6/2004 | Johnson et al. | |
| 2005/0065709 A1 * | 3/2005 | Cullen | 701/112 |
| 2008/0064567 A1 | 3/2008 | Kue et al. | |
| 2008/0074104 A1 | 3/2008 | Sauer et al. | |
| 2008/0078604 A1 | 4/2008 | Ersoy et al. | |
| 2010/0024768 A1 | 2/2010 | Ota et al. | |
| 2010/0312440 A1 * | 12/2010 | Ellis et al. | 701/54 |
| 2010/0312442 A1 | 12/2010 | Ahn | |
| 2011/0035121 A1 | 2/2011 | Katrak et al. | |
| 2012/0152049 A1 | 6/2012 | Benson et al. | |
| 2012/0158270 A1 | 6/2012 | Bur et al. | |
| 2012/0187940 A1 | 7/2012 | Uhlenbruck | |
| 2012/0215392 A1 | 8/2012 | Hashimoto | |
| 2013/0060436 A1 | 3/2013 | Cousins et al. | |
| 2013/0300403 A1 | 11/2013 | Benson et al. | |

FOREIGN PATENT DOCUMENTS

| | | | |
|---|---|---|---|
| DE | 19924995 A1 | 12/2000 | |
| DE | 10310831 A1 | 11/2003 | |
| DE | 10308748 A1 | 12/2003 | |
| DE | 10333931 A1 | 2/2005 | |
| DE | 102007032996 A1 | 2/2008 | |
| DE | 102007045443 A1 | 4/2009 | |
| DE | 102010002592 A1 | 9/2010 | |
| DE | 102009054239 A1 | 5/2011 | |
| DE | 102009053873 A1 | 6/2011 | |
| EP | 1930631 A2 | 6/2008 | |
| GB | 2466040 A | 6/2010 | |
| JP | 2004143990 A | * | 5/2004 |
| JP | 4135465 B2 | 8/2008 | |
| WO | WO-2005009770 A1 | 2/2005 | |
| WO | WO-2011061223 A1 | 5/2011 | |
| WO | WO-2011070673 A1 | 6/2011 | |

OTHER PUBLICATIONS

Schwenger, Andreas; English abstract of Dissertation (p. 5), "Active Damping of Driveline Oscillations", 160 total pages, Jul. 1970.

* cited by examiner

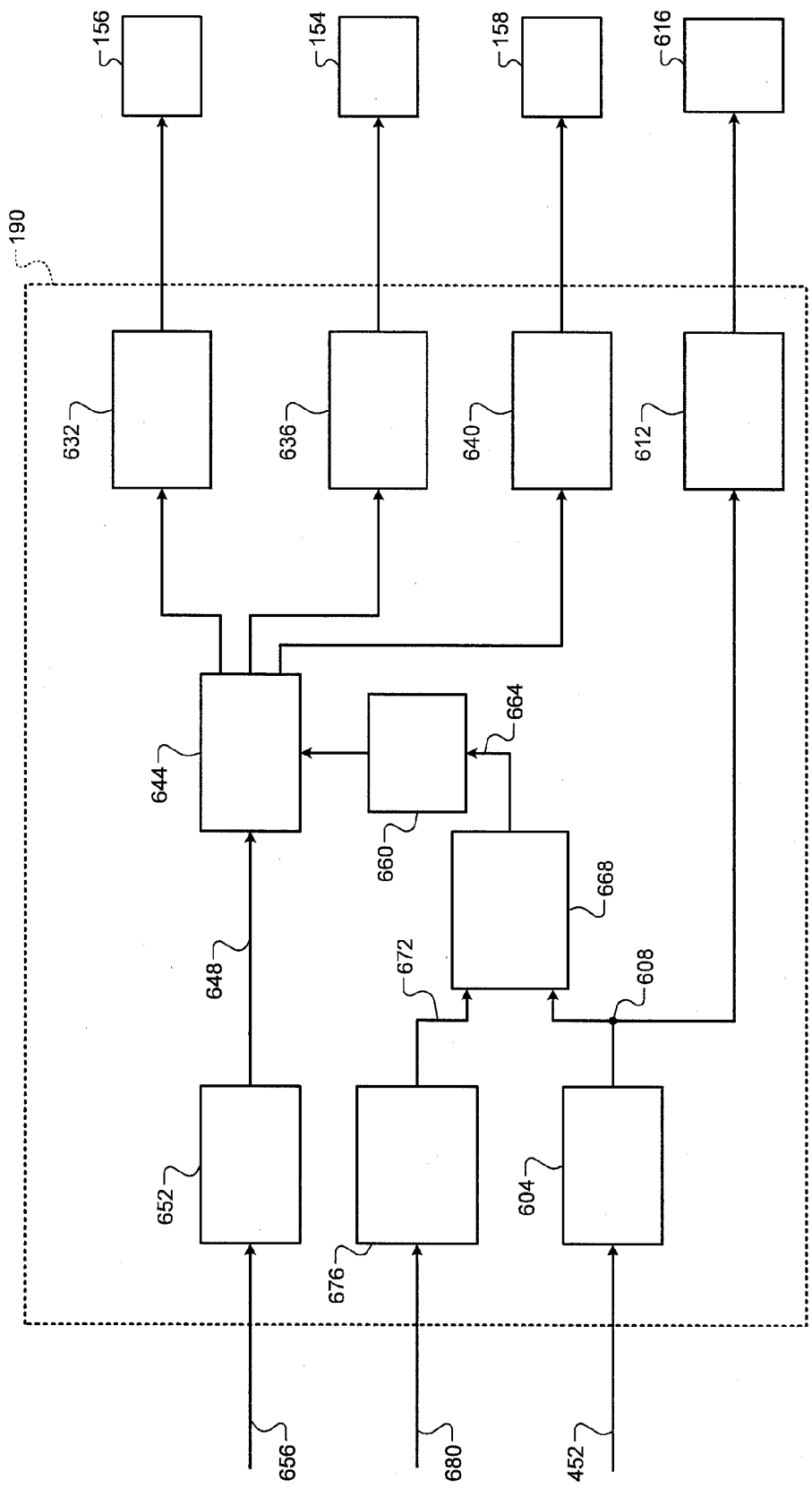

ACTIVE FUEL MANAGEMENT SYSTEMS AND METHODS FOR VEHICLES WITH A MANUAL TRANSMISSION

CROSS-REFERENCE TO RELATED APPLICATIONS

This application is related to U.S. Provisional Application No. 61/425,626, filed on Dec. 21, 2010. The disclosure of the above application is incorporated herein by reference in its entirety.

FIELD

The present disclosure relates to internal combustion engines and more particularly to engine control systems and methods for vehicles with a manual transmission and a gear absolute position (GAP) sensor.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An engine combusts an air/fuel mixture to produce drive torque. Air is drawn into the engine through an intake manifold. A throttle valve may vary airflow into the intake manifold. An electronic throttle controller (ETC) may control opening of the throttle valve. The air mixes with fuel provided by a fuel injector to form an air and fuel mixture. The air/fuel mixture is combusted within one or more cylinders of the engine.

Exhaust resulting from combustion is expelled from the cylinders to an exhaust system. Power resulting from combustion is output by the engine to a transmission. The transmission may transfer torque to one or more wheels of the vehicle. A driver may select a gear ratio within the transmission using a shift lever or knob.

An intake valve and an exhaust valve are associated with each cylinder of the engine. Generally, opening of the intake and exhaust valves may be regulated based on rotation of a crankshaft of the engine. However, the opening (e.g., timing) of the intake valve and the exhaust valve may be adjusted using an intake cam phaser and an exhaust cam phaser, respectively.

SUMMARY

A system for a vehicle includes an active fuel management (AFM) module, an expected engine speed determination module, and a disabling module. The AFM module selectively cuts off fuel to at least one cylinder of an engine and maintains valves of the at least one cylinder in closed positions. The expected engine speed determination module determines an expected engine speed based on a position of a shift lever of a manual transmission measured using a position sensor module. The disabling module selectively disables the AFM module based on the expected engine speed.

A method for a vehicle includes: selectively cutting off fuel to at least one cylinder of an engine and maintaining valves of the at least one cylinder in closed positions; determining an expected engine speed based on a position of a shift lever of a manual transmission measured using a position sensor module; and selectively disabling the cutting off fuel and the maintaining valves in the closed positions based on the expected engine speed.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

FIG. 6 is a functional block diagram of an example active fuel management (AFM) system according to the present disclosure.

DETAILED DESCRIPTION

Figure 1:
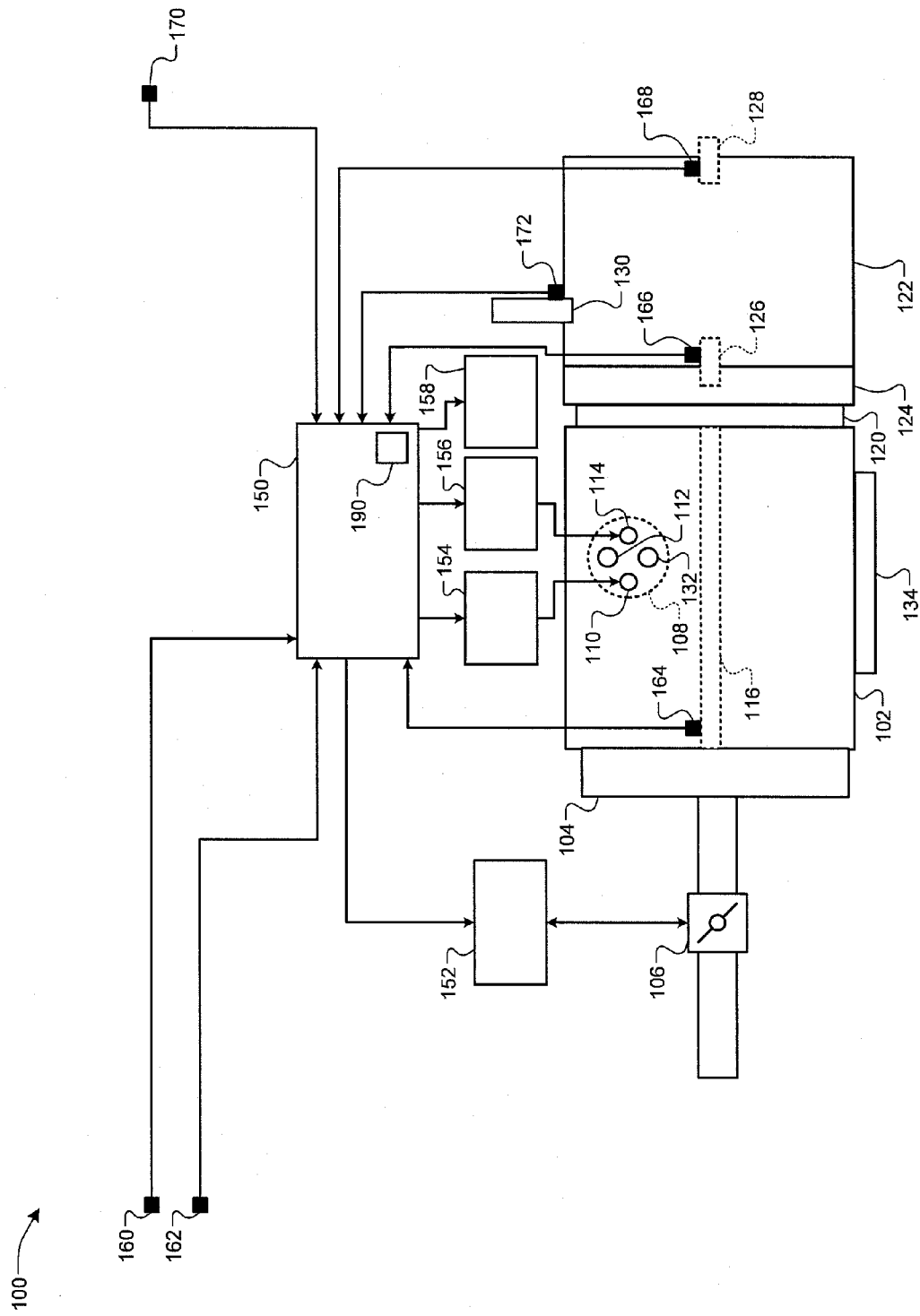
FIG. 1 is a functional block diagram of an example vehicle system according to the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

An engine combusts a mixture of air and fuel to generate drive torque for a vehicle. An engine control module controls operation of the engine. Under some circumstances, the engine control module may selectively operate the engine in an active fuel management (AFM) mode.

The engine control module may cut off fuel to one or more cylinders of the engine during operation in the AFM mode. Cutting off fuel to the one or more cylinders decreases fuel consumption. The engine control module also maintains intake and exhaust valves of the one or more cylinders in closed positions during operation in the AFM mode. Maintaining the valves of the one or more cylinders in the closed positions minimizes losses associated with pumping air through the one or more cylinders (i.e., pumping losses).

The engine control module may operate the engine in the AFM mode when an engine speed is less than a predetermined speed. One or more engine components may be damaged if the engine is operated in the AFM mode when the engine speed is greater than the predetermined speed.

The engine outputs torque to a manual transmission. A driver actuates a shift lever assembly to select one of a plurality of predetermined gear ratios within the manual transmission. A gear absolute position (GAP) sensor module generates a GAP signal based on the position of the shift lever assembly.

A gear shift may cause a change in the engine speed. For example only, the engine speed may increase when the driver performs a downshift (e.g., from a third gear to a second gear). A downshift performed during operation in the AFM mode may cause the engine speed to become greater than the predetermined engine speed.

The engine control module of the present disclosure generates an expected engine speed based on the GAP signal and a vehicle speed. The engine control module selectively disables operation in the AFM mode based on the expected engine speed. For example only, the engine control module may disable operation in the AFM mode when the expected engine speed is greater than the predetermined engine speed. The engine control module may allow operation in the AFM mode to continue when the expected engine speed is less than the predetermined engine speed.

Referring now to FIG. 1, a functional block diagram of an example vehicle system 100 is presented. An engine 102 combusts an air/fuel mixture to produce drive torque for a vehicle. While the engine 102 is shown and will be discussed in terms of a spark-ignition engine, the engine 102 may be another suitable type of prime mover, such as a compression-ignition engine, a hybrid type engine, an electric motor, etc.

Air may be drawn into an intake manifold 104 through a throttle valve 106. The throttle valve 106 may regulate air flow into the intake manifold 104. Air within the intake manifold 104 is drawn into one or more cylinders of the engine 102, such as cylinder 108.

One or more fuel injectors, such as fuel injector 110, inject fuel that mixes with air to form an air/fuel mixture. One fuel injector may be provided for each cylinder of the engine 102. The fuel injectors may be associated with an electronic or mechanical fuel injection system, a jet or port of a carburetor, or another suitable type of fuel injection system.

One or more intake valves, such as intake valve 112, open to allow air into the cylinder 108. A piston (not shown) compresses the air/fuel mixture within the cylinder 108. A spark plug 114 may initiate combustion of the air/fuel mixture within the cylinder 108.

Combustion of the air/fuel mixture applies force to the piston. The piston rotatably drives a crankshaft 116. The engine 102 outputs torque via the crankshaft 116. A flywheel 120 is coupled to and rotates with the crankshaft 116. For example only, the flywheel 120 may include a dual mass flywheel (DMF) or another suitable type of flywheel.

Torque output by the engine 102 is selectively transferred to a manual transmission 122 via a clutch 124. A driver actuates the clutch 124 to engage and disengage the transmission 122 to and from the engine 102. Torque is input to the transmission via a transmission input shaft 126. The transmission 122 outputs torque to propel the vehicle via a transmission output shaft 128. The driver selects a gear ratio (or drive ratio) using a shift lever assembly 130 (see also FIGS. 2-3).

Exhaust produced by combustion of the air/fuel mixture is expelled from the cylinder 108 via an exhaust valve 132. The exhaust is expelled from the engine 102 to an exhaust system 134. The exhaust system 134 may treat the exhaust before the exhaust is released to the atmosphere. Although only one intake and exhaust valve is shown and described as being associated with the cylinder 108, more than one intake and/or exhaust valve may be associated with each cylinder of the engine 102.

An engine control module (ECM) 150 controls the torque output of the engine 102. For example only, the ECM 150 may control the torque output of the engine 102 by controlling various engine actuators. The engine actuators may include, for example, a throttle actuator module 152, a fuel actuator module 154, a spark actuator module 156, and a valve actuator module 158. The vehicle system 100 may also include other engine actuators, and the ECM 150 may control the other engine actuators.

Each engine actuator controls an operating parameter based on a signal from the ECM 150. For example only, the throttle actuator module 152 may control opening of the throttle valve 106, the fuel actuator module 154 may control fuel injection (e.g., timing and amount), and the spark actuator module 156 may control spark timing. The valve actuator module 158 may control valve lift. More specifically, the valve actuator module 158 may control the amount that the intake and exhaust valves open.

The ECM 150 may control the torque output of the engine based on, for example, driver inputs, measured parameters, and inputs from various vehicle systems. The vehicle systems may include, for example, a transmission system, a hybrid control system, a stability control system, a chassis control system, and other suitable vehicle systems.

The driver inputs may include, for example, an accelerator pedal position (APP), a brake pedal position (BPP), cruise control inputs, and one or more other suitable driver inputs. An APP sensor 160 measures position of an accelerator pedal (not shown) and generates the APP based on the position of the accelerator pedal. A BPP sensor 162 monitors actuation of a brake pedal (not shown) and generates the BPP based on the position of the brake pedal.

A crankshaft position sensor 164 generates a crankshaft position signal based on rotation of the crankshaft 116. The crankshaft position signal may be used to determine an engine speed. For example only, the crankshaft position signal may include a pulse train. The crankshaft position sensor 164 may generate a pulse each time that a tooth of an N-toothed wheel (not shown) passes the crankshaft position sensor 164. The N-toothed wheel is attached to and rotates with the crankshaft 116.

A transmission input shaft speed (TISS) sensor 166 generates a TISS signal based on rotation of the transmission input shaft 126. A transmission output shaft speed (TOSS) sensor 168 generates a TOSS signal based on rotation of the transmission output shaft 128. A wheel speed sensor 170 generates a wheel speed signal based on rotation of a wheel (not shown) of the vehicle. For example only, one wheel speed sensor may be provided for each wheel of the vehicle. A vehicle speed may be determined based on one or more of the wheel speeds and/or one or more other suitable parameters (e.g., the TOSS).

A gear absolute position (GAP) sensor module 172 monitors position of the shift lever assembly 130. The GAP sensor module 172 generates a GAP signal based on the position of the shift lever assembly 130. As stated above, the driver actuates the shift lever assembly 130 to select the gear ratio within the transmission 122.

The ECM 150 may selectively operate the engine 102 in an active fuel management (AFM) mode. The ECM 150 may determine whether to operate the engine 102 in the AFM mode based on the engine speed and one or more other suitable parameters. For example only, the ECM 150 may selectively operate the engine 102 in the AFM mode when the engine speed is less than a predetermined speed. One or more engine components may be damaged if the engine 102 is operated in the AFM mode and the engine speed is greater than the predetermined speed. For example only, the predetermined speed may be approximately 3000 revolutions per minute (rpm) or another suitable speed that is greater than zero.

To operate the engine 102 in the AFM mode, the ECM 150 cuts off fuel to one or more cylinders of the engine 102. For example only, the ECM 150 may cut off fuel to half of the cylinders of the engine 102 for operation in the AFM mode. The ECM 150 may also disable spark to the one or more cylinders during operation in the AFM mode. The ECM 150 maintains the intake and exhaust valves in closed positions throughout operation in the AFM mode. Maintaining the intake and exhaust valves in the close positions minimizes pumping losses during operation in the AFM mode.

Because the transmission 122 is a manual transmission, the driver can perform a gear shift and change the gear ratio engaged within the transmission 122 during operation in the AFM mode. A downshift causes the engine speed to increase. A downshift, and especially a downshift where one or more gear ratios are skipped (e.g., a fourth gear to first gear downshift), may cause the engine speed to become greater than the predetermined speed.

The ECM 150 of the present disclosure includes an AFM control module 190 that selectively enables and disables operation of the engine 102 in the AFM mode. The AFM control module 190 determines an expected engine speed based on the GAP signal output by the GAP sensor module 172. During operation in the AFM mode, the AFM control module 190 may allow operation in the AFM mode to continue or disable operation in the AFM mode based on the expected engine speed. The AFM control module 190 may also prevent operation in the AFM mode based on the expected engine speed.

Figure 2:
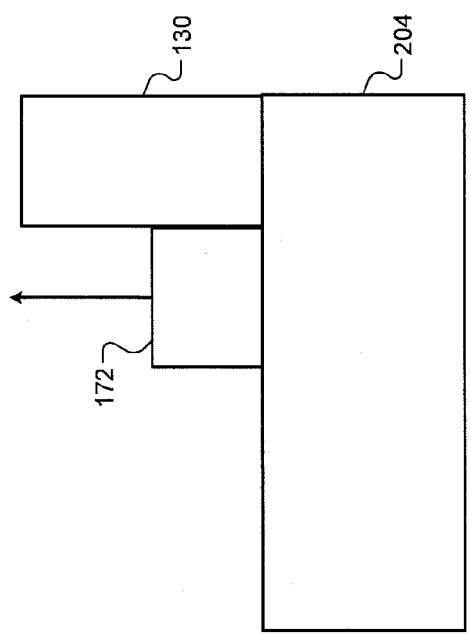
FIG. 2 is a functional block diagram of an example system including a manual transmission, a shift lever assembly for the manual transmission, and a gear absolute position (GAP) sensor module according to the present disclosure.

Referring now to FIG. 2, a functional block diagram of an example transmission system is presented. The shift lever assembly 130 may be attached to and extend to within a transmission housing 204. The transmission housing 204 houses the transmission 122. While the GAP sensor module 172 is shown as being external to the transmission housing 204, the GAP sensor module 172 may be implemented within the transmission housing 204 in various implementations.

The driver actuates the shift lever assembly 130 to select one of a plurality of predetermined gear ratios or neutral. Each of the predetermined gear ratios and neutral is associated with a predetermined location in a shift pattern. The GAP sensor module 172 generates the GAP signal based on the position of the shift lever assembly 130.

Figure 3:
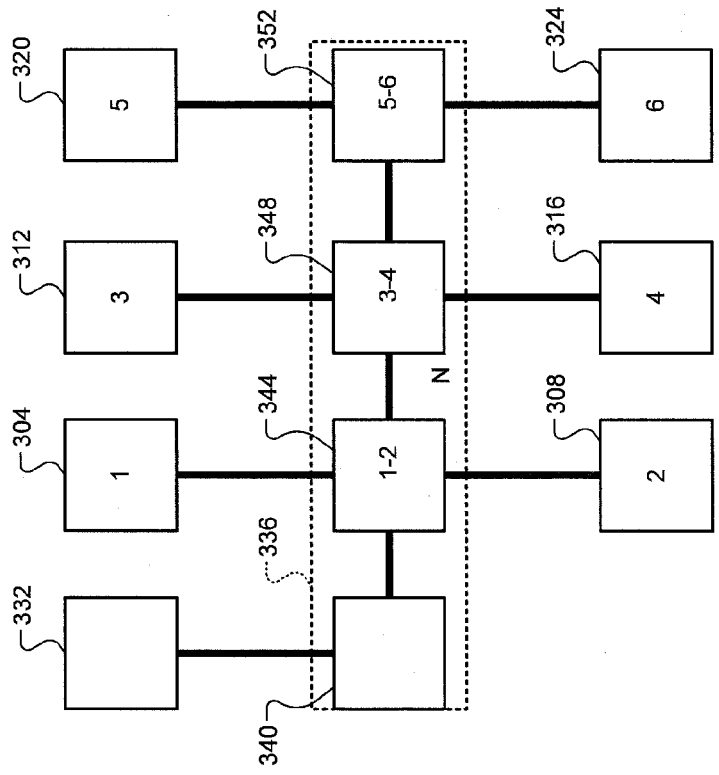
FIG. 3 is an example diagram of a shift pattern for a manual transmission according to the present disclosure.

Referring now to FIG. 3, an example illustration of an H-shaped shift pattern is presented. The predetermined gear ratios and neutral can be selected by actuating the shift lever assembly 130 to one of a plurality of predetermined locations. In the example of FIG. 3, the predetermined locations are arranged in an H-shape.

For example only, first, second, third, fourth, fifth, and sixth gear ratios can be selected by actuating the shift lever assembly 130 to locations 304, 308, 312, 316, 320, and 324, respectively. A reverse gear ratio can be selected by actuating the shift lever assembly 130 to location 332. Neutral can be selected by actuating the shift lever assembly 130 to a location 336. While the example of FIG. 3 includes seven predetermined gear ratios (6 forward gear ratios and 1 reverse gear ratio) and neutral, the transmission 122 may include a greater or fewer number of gear ratios.

For purposes of generating the GAP signal, the neutral location 336 can be segmented into multiple discreet locations. For example only, the neutral location 336 can be segmented into neutral-reverse location 340, 1-2 location 344, 3-4 location 348, and 5-6 location 352. The GAP signal indicating one of the discrete neutral locations may be used, for example, to anticipate the gear ratio that the driver will select.

Figure 4:
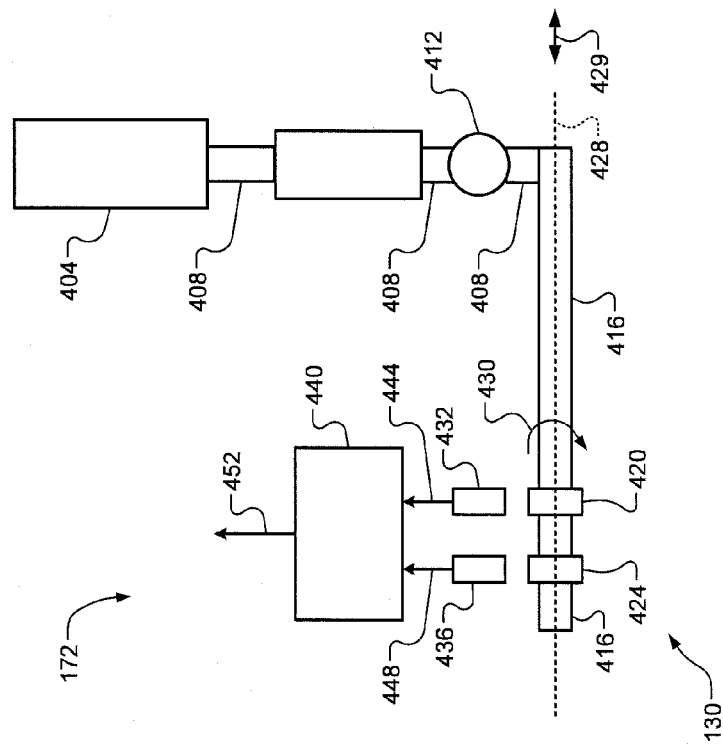
FIG. 4 is an example diagram including a GAP sensor module and a side view of a shift lever assembly according to the present disclosure.

Referring now to FIG. 4, an example diagram of a system including an example of the shift lever assembly 130 and the GAP sensor module 172 is presented. A side view of an example implementation of the shift lever assembly 130 is shown in the example of FIG. 4.

The shift lever assembly 130 may include a shift knob (handle, ball, etc.) 404, a shift lever 408, a ball pivot 412, a shaft 416, a first magnetic member 420, and a second magnetic member 424. The shift lever assembly 130 may also include one or more mounting members, brackets, bearings, and/or other components. Movement of the shift lever 408 in a forward direction or a backward direction (e.g., to select a gear ratio) causes the shaft 416 to move axially. Movement of the shift lever 408 side-to-side (e.g., within the neutral location 336) causes the shaft 416 to rotate about its axis 428. Axial movement (translation) is illustrated by arrow 429. Rotation about the axis 428 is illustrated by arrow 430.

The first and second magnetic members 420 and 424 are coupled to the shaft 416. In this manner, the first and second magnetic members 420 and 424 move and rotate with the shaft 416. For example only, the first and second magnetic members 420 and 424 may have an annular shape or another suitable shape. The first and second magnetic members 420 and 424 may each include one or more teeth, ridges, or another suitable characteristic that can be used to identify the rotation of the shaft 416 about the axis 428. The first and second magnetic members 420 and 424 each generate a magnetic field.

The GAP sensor module 172 may include a first Hall-effect sensor 432, a second Hall-effect sensor 436, and a signal generator module 440. The first and second Hall-effect sensors 432 and 436 generate first and second signals 444 and 448 based on magnetic field sensed by the first and second Hall-effect sensors 432 and 436, respectively. The first and second Hall-effect sensors 432 and 436 are stationary. In various implementations, a single three-dimensional (3D) Hall-Effect sensor may be utilized. In other implementations, anistotropic magneto resistance (AMR), giant magneto resistance (GMR), permanent magnet linear contactless displacement (PLCD), linear variable displacement transformer (LVDT), magneto elastic (ME), magneto inductive (MI), or another suitable type of sensor may be used.

Figure 5A:
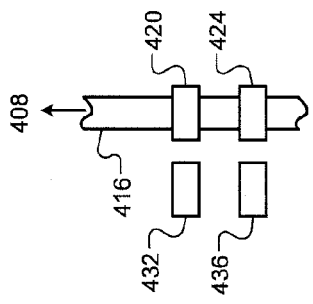
FIGS. 5A-5C are example illustrations for a shift lever assembly arranged in different locations according to the present disclosure.
Figure 5B:
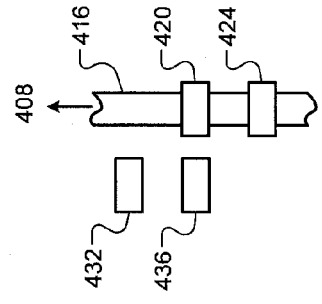
Figure 5C:
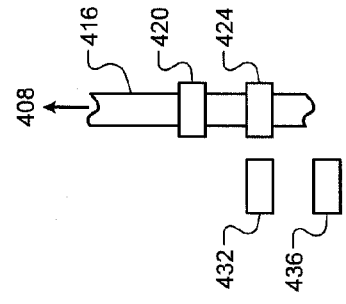

FIGS. 5A-5C include example illustrations of the orientation of the first and second magnetic members 320 and 324 and the first and second Hall-effect sensors 432 and 436. FIG. 5A is an example illustration of the orientation when the shift lever assembly 130 is in one of the neutral locations 340-352. A spacing between the first and second magnetic members 420 and 424 and/or a spacing between the first and second Hall-effect sensors 432 and 436 may be proportional to a distance between the neutral location 336 and each of the locations 304-332.

FIG. 5B is an example illustration of the orientation when the shift lever assembly 130 is actuated in the forward direction. More specifically, the shift lever assembly 130 may be in location 304, location 312, location 320, or location 332 corresponding to the first, third, fifth, and reverse gear ratios, respectively. FIG. 5C is an example illustration of the orientation when the shift lever assembly 130 is actuated in the backward direction. More specifically, the shift lever assembly 130 may be in location 308, location 316, or location 324 corresponding to the second, fourth, and sixth gear ratios, respectively.

Referring to FIGS. 4 and 5A-5C, the first and second Hall-effect sensors 432 and 436 generate the first and second signals 444 and 448 based on magnetic field sensed by the first and second Hall-effect sensors 432 and 436, respectively. More specifically, the first and second Hall-Effect sensors 432 and 436 generate the first and second signals 444 and 448, respectively, based on position of the shaft 416 and rotation of the shaft 416. For example only, the first and second signals 444 and 448 may be pulse width modulation (PWM) signals.

The signal generator module 440 generates a GAP signal 452 based on the first and second signals 444 and 448. For example only, the signal generator module 440 may generate the GAP signal 452 using one of a function and a mapping (e.g., a look up table) that relates the first and second signals to the GAP signal 452. The GAP signal 452 corresponds to one of the locations 304-352.

| Position corresponding to GAP signal 452 | First Signal 444 (PWM Duty Cycle) | Second Signal 448 (PWM Duty Cycle) |
|---|---|---|
| Reverse | 13.3 | 0 |
| 1 | 30 | 0 |
| 2 | 0 | 30 |
| 3 | 50 | 0 |
| 4 | 0 | 50 |
| 5 | 70 | 0 |
| 6 | 0 | 70 |
| Neutral-Reverse | 6.65 | 6.65 |
| Neutral 1-2 | 15 | 15 |
| Neutral 3-4 | 25 | 25 |
| Neutral 5-6 | 35 | 35 |

Referring now to FIG. 6, a functional block diagram of an example implementation of the AFM control module 190 is presented. A GAP determination module 604 determines a GAP 608 based on the GAP signal 452. The GAP 608 indicates one of the locations 304-352. The GAP determination module 604 may determine the GAP 608, for example, using one of a function and a mapping that relates the GAP signal 452 to the GAP 608.

A display control module 612 controls a gear display portion (not shown) of a driver instrumentation cluster (DIC) module 616 based on the GAP 608. For example only, the gear display portion may include an illustration of the shift pattern for the shift lever assembly 130. The display control module 612 may illuminate the location on the gear display portion to indicate the position of the shift lever assembly 130 based on the GAP 608. The DIC module 616 is visible within a passenger cabin of a vehicle.

A spark control module 632 controls the spark actuator module 156. A fuel control module 636 controls the fuel actuator module 154. A valve control module 640 controls the valve actuator module 158. An AFM module 644 selectively generates commands for the spark control module 632, the fuel control module 636, and/or the valve control module 640 for operation in the AFM mode.

For example, the AFM module 644 selectively commands the fuel control module 636 to cut off fuel to one or more cylinders when an engine speed 648 is less than a first predetermined speed. The first predetermined speed is greater than zero and may be, for example, approximately 3000 rpm or another suitable speed. For example only, the first predetermined speed may be greater than 2000 rpm. The AFM module 644 selectively commands the valve control module 640 to maintain the valves of the one or more cylinders in the closed position throughout each combustion cycle. Maintaining the valves in the closed position minimizes pumping losses experienced during operation in the AFM mode. The AFM module 644 may also command the spark control module 632 to disable spark to the one or more cylinders.

The AFM module 644 may specify the one or more cylinders. The one or more cylinders may be predetermined cylinders in a firing order of the cylinders. In various implementations, the AFM module 644 may specify that fuel and spark be cut off and the (intake and exhaust) valves be maintained in the closed position for half of the cylinders of the engine 102.

An engine speed determination module 652 generates the engine speed 648. The engine speed determination module 652 may generate the engine speed 648 based on the crankshaft position signal 656 generated using the crankshaft position sensor 164. For example only, the engine speed determination module 652 may generate the engine speed 648 based on the period between two pulses in the crankshaft position signal 656 (corresponding to two teeth of the N-toothed wheel) and the rotational distance between the two teeth.

A disabling module 660 selectively disables the AFM module 644 to disable (present) operation in the AFM mode based on an expected engine speed 664. The disabling module 660 may disable the AFM module 644 when the expected engine speed 664 is greater than a second predetermined speed. Written alternatively, the disabling module 660 may leave the AFM module 644 enabled when the expected engine speed 664 is less than the second predetermined speed. The second predetermined speed may be the same as or different than (e.g., greater than) the first predetermined speed. The second predetermined speed being the same as (or greater than) the first predetermined speed may enable operation in the AFM mode to be disabled before one or more engine components may be damaged when the engine speed 648 is greater than the first predetermined speed.

An expected engine speed determination module 668 determines the expected engine speed 664. The expected engine speed determination module 668 determines the expected engine speed 664 based on the GAP 608. For example only, the expected engine speed determination module 668 may increase the expected engine speed 664 as the GAP 608 decreases (e.g., fourth gear to third gear) and vice versa for a given vehicle speed.

The expected engine speed determination module 668 may determine the expected engine speed 664 further based on a vehicle speed 672. For example only, for a given value of the GAP 608, the expected engine speed determination module 668 may increase the expected engine speed 664 as the vehicle speed 672 increases and vice versa. The expected engine speed determination module 668 may determine the expected engine speed 664, for example, using at least one of a function and a mapping (e.g., a look up table) that relates the GAP 608 and the vehicle speed 672 to the expected engine speed 664.

A vehicle speed determination module 676 determines the vehicle speed 672. For example only, the vehicle speed determination module 676 may determine the vehicle speed 672 based on one or more measured wheel speeds, such as wheel speed 680 measured using the wheel speed sensor 170.

Figure 7:
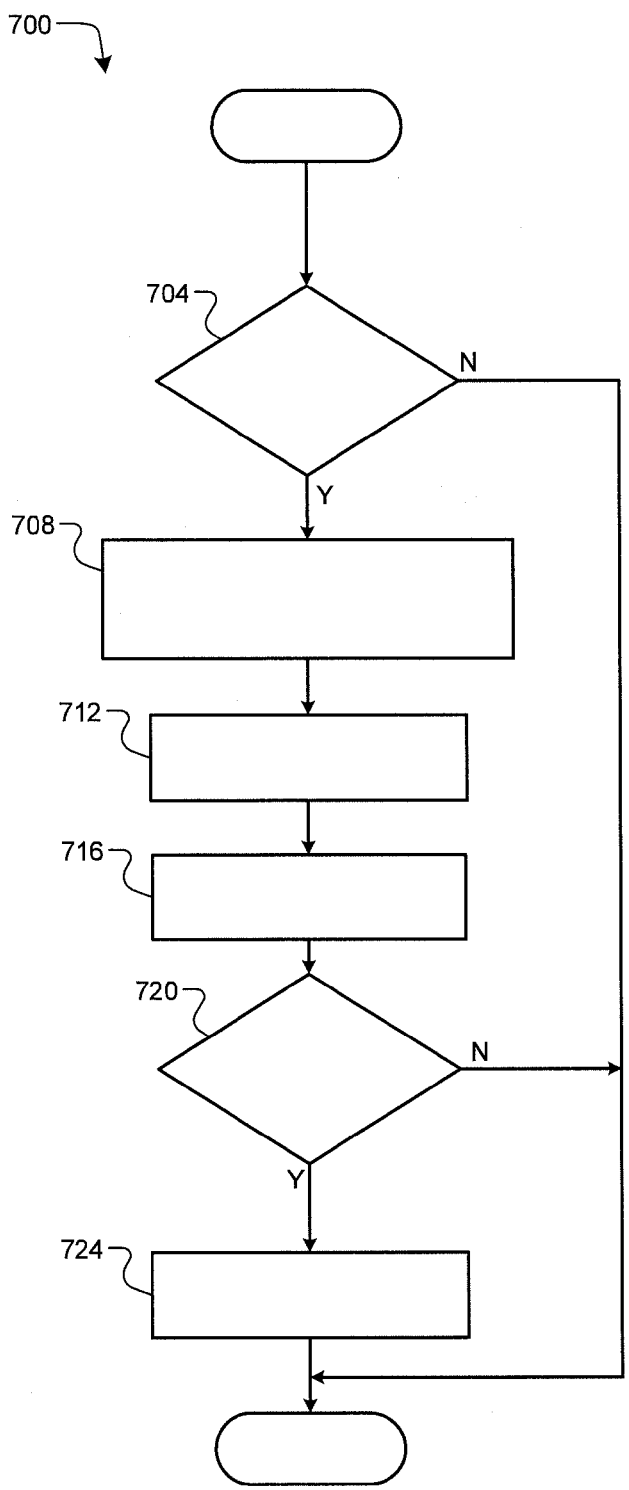
FIG. 7 is a flowchart depicting an example method of controlling operation in AFM mode based on output from a GAP sensor module according to the present disclosure.

Referring now to FIG. 7, a flowchart depicting an example method 700 of controlling operation in the AFM mode is presented. Control may begin with 704 where control determines whether to operate the engine 102 in the AFM mode. If true, control may continue with 708; if false, control may end. For example only, control may determine to operate the engine 102 in the AFM mode when the engine speed 648 is less than the first predetermined speed. Control may determine to not operate the engine 102 in the AF mode when the engine speed 648 is greater than the first predetermined speed. For example only, the first predetermined speed may be approximately 3000 rpm or another suitable speed. For example only, the first predetermined speed may be greater than 2000 rpm.

At 708, control cuts off fuel to one or more cylinders of the engine 102 and maintains the valves (intake and exhaust) of the one or more cylinders in closed positions. Control maintains the valves in the closed positions throughout each combustion cycle during operation in the AFM mode to minimize pumping losses. Control may additionally disable spark to the one or more cylinders at 708.

Control determines the GAP 608 based on the GAP signal 452 generated using the GAP sensor module 172 at 712. Control may display the GAP 608 via the DIC module 616. Control determines the expected engine speed 664 based on the GAP 608 at 716. Control may determine the expected engine speed 664 further based on the vehicle speed 672. For example only, control may increase the expected engine speed 664 as the GAP 608 decreases and/or as the vehicle speed 672 increases. Control may decrease the expected engine speed 664 as the GAP 608 increases and/or as the vehicle speed 672 decreases.

At 720, control may determine whether the expected engine speed 664 is greater than the second predetermined speed. If true, control may disable operation in the AFM mode at 724, and control may end. If false, control may end. The second predetermined speed may be the same as or different than the first predetermined speed. When the AFM mode is disabled, the valves may be returned to opening based on rotation of a camshaft instead of being maintained in the closed positions. Fuel and spark is selectively provided to the cylinders. While control is shown as ending, FIG. 7 may be illustrative of one control loop.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system for a vehicle, comprising:
an active fuel management (AFM) module that selectively cuts off fuel to at least one cylinder of an engine and maintains valves of the at least one cylinder in closed positions;
an expected engine speed determination module that determines an expected engine speed using one of a function and a mapping that relates a position of a shift lever of a manual transmission measured using a position sensor module and a vehicle speed to the expected engine speed; and
a disabling module that selectively disables the AFM module based on the expected engine speed.

2. The system of claim 1 wherein the disabling module disables the AFM module when the expected engine speed is greater than a predetermined speed.

3. The system of claim 2 wherein the predetermined speed is greater than 2000 revolutions per minute.

4. The system of claim 2 wherein the AFM module selectively cuts off fuel to the at least one cylinder of the engine and maintains valves of the at least one cylinder in the closed positions when the expected engine speed is less than the predetermined speed.

5. The system of claim 1 wherein the at least one cylinder is one-half of the cylinders of the engine.

6. A vehicle comprising:
the system of claim 1;
the manual transmission;
the shift lever, wherein the shift lever is actuable to select a gear ratio within the manual transmission; and
the position sensor module, wherein the position sensor module generates a signal based on orientation of the shift lever; and
a gear absolute position (GAP) determination module that generates the position based on the signal.

7. The vehicle of claim 6 further comprising a display control module that controls a display that is visible within a passenger cabin of the vehicle based on the position.

8. The vehicle of claim 6 wherein the position sensor module generates the signal corresponding to one of N forward drive positions, M reverse positions, and O neutral positions, wherein N, M, and O are integers greater than zero.

9. A method for a vehicle, comprising:
selectively cutting off fuel to at least one cylinder of an engine and maintaining valves of the at least one cylinder in closed positions;
determining an expected engine speed using one of a function and a mapping that relates a position of a shift lever of a manual transmission measured using a position sensor module and a vehicle speed to the expected engine speed; and selectively disabling the cutting off fuel and the maintaining valves in the closed positions based on the expected engine speed.

10. The method of claim 9 further comprising disabling the cutting off fuel and the maintaining valves in the closed positions when the expected engine speed is greater than a predetermined speed.

11. The method of claim 10 wherein the predetermined speed is greater than 2000 revolutions per minute.

12. The method of claim 10 further comprising cutting off fuel to the at least one cylinder and maintaining valves of the at least one cylinder in the closed positions when the expected engine speed is less than the predetermined speed.

13. The method of claim 9 wherein the at least one cylinder is one-half of the cylinders of the engine.

14. The method of claim 9 further comprising controlling a display that is visible within a passenger cabin of the vehicle based on the position.

15. The method of claim 9 further comprising:
generating a signal using the position sensor module based on translation and rotation of a shaft that translates and rotates based on movement of the shift lever; and
determining the position based on the signal.

16. The method of claim 15 setting the position to correspond to one of N forward drive positions, M reverse positions, and O neutral positions,
wherein N, M, and O are integers greater than zero.

* * * * *

UNITED STATES PATENT AND TRADEMARK OFFICE
CERTIFICATE OF CORRECTION

| | |
|---|---|
| PATENT NO. | : 9,103,646 B2 |
| APPLICATION NO. | : 13/228790 |
| DATED | : August 11, 2015 |
| INVENTOR(S) | : Bradford W. Bur |

It is certified that error appears in the above-identified patent and that said Letters Patent is hereby corrected as shown below:

<u>Title Page</u>, Item [73] Assignee, insert the following:
--GM Global Technology Operations LLC, Detroit, MI (US)--

Signed and Sealed this
Tenth Day of May, 2016

Michelle K. Lee
*Director of the United States Patent and Trademark Office*